United States Patent
Fadhel et al.

(10) Patent No.: US 11,365,120 B2
(45) Date of Patent: *Jun. 21, 2022

(54) NICKEL-CONTAINING CATALYST COMPOSITION HAVING ENHANCED ACIDITY FOR STEAM REFORMING PROCESSES

(71) Applicant: Saudi Arabian Oil Company, Dhahran (SA)

(72) Inventors: Bandar A. Fadhel, Dhahran (SA); Bandar H. Alsolami, Dhahran (SA); Rami Bamagain, Dhahran (SA); Mohammed A. Albuali, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 227 days.

This patent is subject to a terminal disclaimer.

(21) Appl. No.: 16/775,035

(22) Filed: Jan. 28, 2020

(65) Prior Publication Data

US 2021/0229989 A1 Jul. 29, 2021

(51) Int. Cl.
*C01B 3/26* (2006.01)
*C01B 32/40* (2017.01)
(Continued)

(52) U.S. Cl.
CPC .............. *C01B 3/26* (2013.01); *B01J 23/755* (2013.01); *B01J 35/023* (2013.01);
(Continued)

(58) Field of Classification Search
CPC ... C01B 3/26; C01B 32/40; C01B 2203/0233; C01B 2203/0283; C01B 2203/1614;
(Continued)

(56) References Cited

U.S. PATENT DOCUMENTS 3,186,797 A * 6/1965 Pearce ............... C01B 3/38
252/376
4,017,425 A 4/1977 Shiao
(Continued)

FOREIGN PATENT DOCUMENTS

CN 104627960 A 5/2015
CN 105478120 A 4/2016
(Continued)

OTHER PUBLICATIONS

Bi-reforming of methane from any source with steam and carbon dioxide exclusively to metgas (CO-2H2) for methanol and hydrocarbon synthesis George A. Olah et al. J. Am. Chem. Soc. V135, pp. 648-650 (Year: 2013).*

(Continued)

*Primary Examiner* — Douglas B Call
(74) *Attorney, Agent, or Firm* — Bracewell LLP; Constance G. Rhebergen; Eleanor L. Tyson

(57) ABSTRACT

Modified red mud catalyst compositions, methods for production, and methods of use in steam reforming, the composition comprising: red mud material produced from an alumina extraction process from bauxite ore; and nickel oxide, the nickel oxide present at between about 5 wt. % to about 40 wt. % of the modified red mud catalyst composition.

15 Claims, 1 Drawing Sheet

(51) Int. Cl.
  *B01J 23/755* (2006.01)
  *B01J 35/02* (2006.01)
  *B01J 35/10* (2006.01)
(52) U.S. Cl.
  CPC ........... *B01J 35/1014* (2013.01); *C01B 32/40* (2017.08); *C01B 2203/0233* (2013.01); *C01B 2203/0283* (2013.01); *C01B 2203/1614* (2013.01); *C01B 2203/1628* (2013.01)
(58) Field of Classification Search
  CPC ............. C01B 2203/1628; B01J 23/755; B01J 35/023; B01J 35/1014
  USPC ......................................................... 423/65
  See application file for complete search history.

(56) References Cited

U.S. PATENT DOCUMENTS

| | | | |
|---|---|---|---|
| 4,451,578 | A | 5/1984 | Setzer et al. |
| 5,525,322 | A * | 6/1996 | Willms ..................... B01J 4/04 423/653 |
| 6,340,437 | B1 | 1/2002 | Yagi et al. |
| 10,179,326 | B2 | 1/2019 | Basset et al. |
| 2003/0024806 | A1 | 2/2003 | Foret |
| 2005/0221977 | A1 | 10/2005 | Fukunaga et al. |
| 2006/0216227 | A1 | 9/2006 | Idem et al. |
| 2011/0027674 | A1 | 2/2011 | Sato et al. |
| 2012/0273728 | A1* | 11/2012 | Abatzoglou ........... B01J 35/002 252/372 |
| 2013/0206606 | A1* | 8/2013 | Gilliam ..................... C25B 1/02 205/351 |
| 2014/0369907 | A1 | 12/2014 | Boudreault et al. |
| 2016/0129423 | A1 | 5/2016 | Basset et al. |
| 2016/0367970 | A1 | 12/2016 | Goyal et al. |
| 2019/0300364 | A1* | 10/2019 | Weiss ....................... C01B 3/40 |
| 2019/0308183 | A1 | 10/2019 | Agblevor et al. |

FOREIGN PATENT DOCUMENTS

| | | |
|---|---|---|
| CN | 107433200 A | 12/2017 |
| CN | 105170155 B | 5/2018 |
| CN | 111097441 A | 5/2020 |
| GB | 714284 A | 8/1954 |
| GB | 916216 A | 1/1963 |
| JP | S60203694 A | 10/1985 |
| JP | 2007084389 A | 4/2007 |
| RU | 2542177 C1 | 2/2015 |
| WO | 0000285 A1 | 1/2000 |
| WO | 2010118133 A1 | 10/2010 |
| WO | 2019138002 A1 | 7/2019 |

OTHER PUBLICATIONS

Alharthi et al., "Hydrocarbon Cracking Over Red Mud and Modified Red Mud Samples," Journal of Sustainable Metallurgy 2:387-393, 2016.
Balakrishnan et al., "Hydrogen production from methane in the presence of red mud—making mud magnetic," Green Chemistry, 11, 42-47, 2009.
Balakrishnan et al., "Waste materials—catalytic opportunities: an overview of the application of large scale waste materials as resources for catalytic applications," Green Chemistry, 2011, 13, 16.
Bennett et al., "Catalytic Applications of Waste Derived Materials", Journal of Materials Chemistry A, pp. 1-22, 2013.
Dulger Irdem et al. "Steam Reforming of Tar Derived from Walnut Shell and Almond Shell Gasification on Red Mud and Iron-Ceria Catalysts", Energy&Fuels, 2014.
Fang et al., "A Nanomesoporous Catalyst from Modified Red Mud and Its Application for Methane Decomposition to Hydrogen Production," Journal of Nanomaterials, Hindawi, 2016.
Liu et al., "Preparation of Modified Red Mud-Supported Fe Catalysts for Hydrogen Production by Catalytic Methane Decomposition," Journal of Nanomaterials, Article ID 8623463, 2017.
Ortiz et al. "Hydrogen production with CO2 capture by coupling steam reforming of methane and chemical-looping combustion: Use of an iron-based waste product as oxygen carrier burning a PSA tail gas," Journal of Power Sources, 196, pp. 4370-4381, 2011.
International Search Report and Written Opinion for PCT Application No. PCT/US2021/015132 dated Mar. 29, 2021: pp. 1-12.
International Search Report and Written Opinion for PCT Application No. PCT/US2021/015133 dated Mar. 29, 2021: pp. 1-12.
International Search Report and Written Opinion for PCT Application No. PCT/US2021/015134 dated Mar. 29, 2021: pp. 1-12.
International Search Report and Written Opinion for PCT Application No. PCT/US2021/015188 dated Mar. 29, 2021: pp. 1-11.
International Search Report and Written Opinion for PCT Application No. PCT/US2021/015191 dated Mar. 29, 2021: pp. 1-11.
International Search Report and Written Opinion for PCT Application No. PCT/US2021/015194 dated Mar. 29, 2021: pp. 1-12.
International Search Report and Written Opinion for PCT Application No. PCT/US2021/015196 dated Apr. 14, 2021: pp. 1-11.
International Search Report and Written Opinion for PCT Application No. PCT/US2021/015303 dated Mar. 30, 2021: pp. 1-12.
International Search Report and Written Opinion for PCT Application No. PCT/US2021/015307 dated Mar. 31, 2021: pp. 1-11.
International Search Report and Written Opinion for PCT Application No. PCT/US2021/015370 dated Apr. 14, 2021: pp. 1-11.
International Search Report and Written Opinion for PCT Application No. PCT/US2021/015371 dated Mar. 31, 2021: pp. 1-11.
Cheng et al., "Tar Elimination from Biomass Gasification Syngas with Bauxite Residue Derived Catalysts and Gasification Char," Applied Energy, vol. 258, Nov. 26, 2019: pp. 1-18.
Das et al., "A Review on Advances in Sustainable Energy Production through Various Catalytic Processes by using Catalysts Derived from Waste Red Mud," Renewable Energy, vol. 143, May 31, 2019: pp. 1791-1811.
Duman et al., "Hydrogen Production from Algal Biomass via Steam Gasification," Bioresource Technology, vol. 166, May 5, 2014: pp. 24-30.
Ebrahiminejad et al., "Hydrocracking and Hydrodesulfurization of Diesel over Zeolite Beta-Containing NiMo Supported an Activated Red Mud," Advanced Powder Technology, vol. 30(8), May 17, 2019: pp. 1450-1461.
Jahromi et al., "Hydrodeoxygenation of Aqueous-Phase Catalytic Pyrolysis Oil to liquid Hydrocarbons Using Multifunctional Nickel Catalyst," Ind. Eng. Chem. Res., vol. 57(39), Sep. 7, 2018: pp. 13257-13268.
Mathur et al., "Ore Catalysts in Two-Stage Coal Liquefaction," FUEL, vol. 65(6), Jun. 1, 1986: pp. 790-796.
Paredes et al., "Catalytic Combustion of Methane over Red Mud-Based Catalysts," Applied Catalysis B: Environmental, vol. 47, Jan. 1, 2004: pp. 37-45.
U.S. Appl. No. 16/775,019, "Nickel-Containing Catalyst Composition Having Enhanced Acidity for Dry Reforming Processes", filed Jan. 28, 2020.
U.S. Appl. No. 16/775,050, "Nickel-Containing Catalyst Composition Having Enhanced Acidity for Autothermal Reforming Processes", filed Jan. 28, 2020.
U.S. Appl. No. 16/775,063, "Nickel-Containing Catalyst Composition Having Enhanced Acidity for Bi-Reforming Processes", filed Jan. 28, 2020.
U.S. Appl. No. 16/775,081, "Catalyst Carrier for Dry Reforming Processes", filed Jan. 28, 2020.
U.S. Appl. No. 16/775,096, "Catalyst Carrier for Steam Reforming Processes", filed Jan. 28, 2020.
U.S. Appl. No. 16/775,102, "Catalyst Carrier for Autothermal Reforming Processes", filed Jan. 28, 2020.
U.S. Appl. No. 16/775,119, "Catalyst Carrier for Bi-Reforming Processes", filed Jan. 28, 2020.
U.S. Appl. No. 16/775,135, "Catalyst Compositions Having Enhanced Acidity for Dry Reforming Processes", filed Jan. 28, 2020.
U.S. Appl. No. 16/775,147, "Catalyst Compositions Having Enhanced Acidity for Steam Reforming Processes", filed Jan. 28, 2020.

(56) References Cited

OTHER PUBLICATIONS

U.S. Appl. No. 16/775,158, "Catalyst Compositions Having Enhanced Acidity for Autothermal Reforming Processes", filed Jan. 28, 2020.
U.S. Appl. No. 16/775,167, "Catalyst Compositions Having Enhanced Acidity for Bi-Reforming Processes", filed Jan. 28, 2020.
Smiciklas et al., "Effect of acid treatment on red mud properties with implications on Ni(II) sorption and stability", Chemical Engineering Journal, 242, 2014, pp. 27-35.
International Search Report and Written Opinion of PCT Application No. PCT/US2021/015131 dated May 11, 2021: pp. 1-12.
Theofanidis et al., "Enhanced carbon-resista nt dry reforming Fe—Ni catalyst: Role of Fe," ACS Catal., vol. 5(5), May 26, 2015: pp. 3028-3039.

* cited by examiner

NICKEL-CONTAINING CATALYST COMPOSITION HAVING ENHANCED ACIDITY FOR STEAM REFORMING PROCESSES

BACKGROUND

Field

Embodiments of the disclosure relate to catalyst compositions for use in reforming processes. In particular, certain embodiments of the disclosure relate to nickel-containing catalyst compositions for and methods of steam reforming.

Description of the Related Art

Steam reforming of natural gas is a method of producing commercial bulk hydrogen. Methane and steam are used to produce carbon monoxide and hydrogen (synthesis gas or syngas). In addition, more hydrogen is produced through the water-gas shift reaction. Equation 1 shows the general chemical equation for steam reforming and Equation 2 shows the general chemical equation for the water-gas shift reaction.

$$CH_4 + H_2O \leftrightarrows CO + 3H_2 \qquad \text{Eq. 1}$$

$$CO + H_2O \leftrightarrows CO_2 + H_2 \qquad \text{Eq. 2}$$

One challenge in steam reforming is the high thermodynamic potential for coke formation on catalysts. Other challenges include high energy consumption and $CO_2$ emissions. Nickel catalysts with aluminum oxide and magnesium oxide as supports are used in steam reforming.

Present catalyst technology is insufficient in some processes to provide cost-effective and durable means for steam reforming.

SUMMARY

Applicant has recognized a need for compositions of nickel-modified red mud to be applied in systems and processes for steam reforming. An enhanced-acidity nickel-containing catalyst composition is disclosed. The enhanced-acidity nickel-containing catalyst also contains in some embodiments Fe, Al, Si, Na, Ca, and Ti oxides from red mud. In embodiments of the present disclosure, red mud acts as a catalyst in addition to or alternative to a catalyst carrier. Disclosed compositions are useful as a catalyst in steam reforming processes for the conversion of methane to syngas, according to Equation 1 in addition to or alternative to Equation 2. Utilization of red mud in steam reforming processes provides the concurrent advantages of utilizing a waste material (red mud) and producing useful $H_2$.

Red mud is a caustic waste material produced from bauxite ore processing for alumina extraction, and is utilized here as a catalyst for a steam reforming process. Surprisingly and unexpectedly, without being specifically designed as a catalyst (for example using specific zeolitic structure), red mud waste material can be readily modified for use as a catalyst. Red mud generally includes a mixture of transition metals such as Ti, Fe, and Al, which make it an advantageous catalyst for steam reforming processes, for example once modified with nickel.

Embodiments disclosed here apply red mud as an active catalyst support, promotor, in addition to or alternative to catalyst to produce hydrogen through steam reforming of methane, optionally followed by a water-gas shift reaction to produce additional $H_2$ (Equation 2). Modified red mud compositions of the present disclosure can be used as an active catalyst support, promoter, in addition to or alternative to catalyst in either or both of Equations 1 and 2.

Therefore, disclosed here are methods for steam reforming over a modified red mud catalyst composition, one method including providing a methane feed and a steam feed to react over the modified red mud catalyst composition at increased temperature and increased pressure to produce synthesis gas comprising $H_2$ and CO, the composition comprising: red mud material produced from an alumina extraction process from bauxite ore; and nickel oxide, the nickel oxide present at between about 5 wt. % to about 40 wt. % of the modified red mud catalyst composition. In some embodiments, the increased temperature is between about 500° C. to about 1000° C. In other embodiments, the increased temperature is between about 600° C. to about 800° C. Still in other embodiments, the increased temperature is about 750° C. In certain embodiments, the increased pressure is between about 5 bar and about 20 bar. In some other embodiments, the increased pressure is between about 10 bar and about 15 bar. In yet other embodiments, the increased pressure is about 14 bar.

Still in other embodiments of steam reforming, the methane conversion rate is at least about 40% for at least about 6 hours. In certain other embodiments, gas hourly space velocity of the methane feed and carbon dioxide feed mixed is between about 1000 $h^{-1}$ to 10000 $h^{-1}$. Still in other embodiments, the composition includes at least one component selected from the group consisting of: $Fe_2O_3$, $Al_2O_3$, $SiO_2$, $Na_2O$, CaO, and $TiO_2$. In some embodiments, a majority of the particles of the composition have a particle size of less than about 70 μm. In other embodiments, the nickel oxide is present at between about 10 wt. % to about 30 wt. % of the modified red mud catalyst composition. Still in other embodiments, the nickel oxide is present at between about 15 wt. % to about 25 wt. % of the modified red mud catalyst composition. In certain embodiments, the nickel oxide is present at about 20 wt. % of the modified red mud catalyst composition.

Some embodiments of the method include the step of carrying out a water-gas shift reaction on the syngas produced in the producing step. Still in other embodiments, the step of carrying out the water-gas shift reaction applies the modified red mud catalyst composition as a catalyst. In certain embodiments, a molar ratio of the steam feed to the methane feed is between about 2:1 and about 4:1. Still in other embodiments, produced $H_2$ is at least about 5 mol. % of produced products from the reaction, with or without water-gas shift, for at least about 5 hours. In certain embodiments, the Brunauer-Emmett-Teller (BET) surface area of the modified red mud catalyst composition is between about 50 $m^2/g$ and about 90 $m^2/g$. And still in other embodiments, the composition includes between about 5 wt. % and about 20 wt. % $Al_2O_3$, between about 2 wt. % and about 10 wt. % CaO, between about 20 wt. % and about 40 wt. % $Fe_2O_3$, between about 5 wt. % and about 20 wt. % $SiO_2$, and between about 10 wt. % and about 20 wt. % $TiO_2$.

BRIEF DESCRIPTION OF THE DRAWING

These and other features, aspects, and advantages of the present disclosure will become better understood with regard to the following descriptions, claims, and accompanying drawing. It is to be noted, however, that the drawing illustrates only several embodiments of the disclosure and is therefore not to be considered limiting of the disclosure's scope as it can admit to other equally effective embodiments.

DETAILED DESCRIPTION

Figure 1:
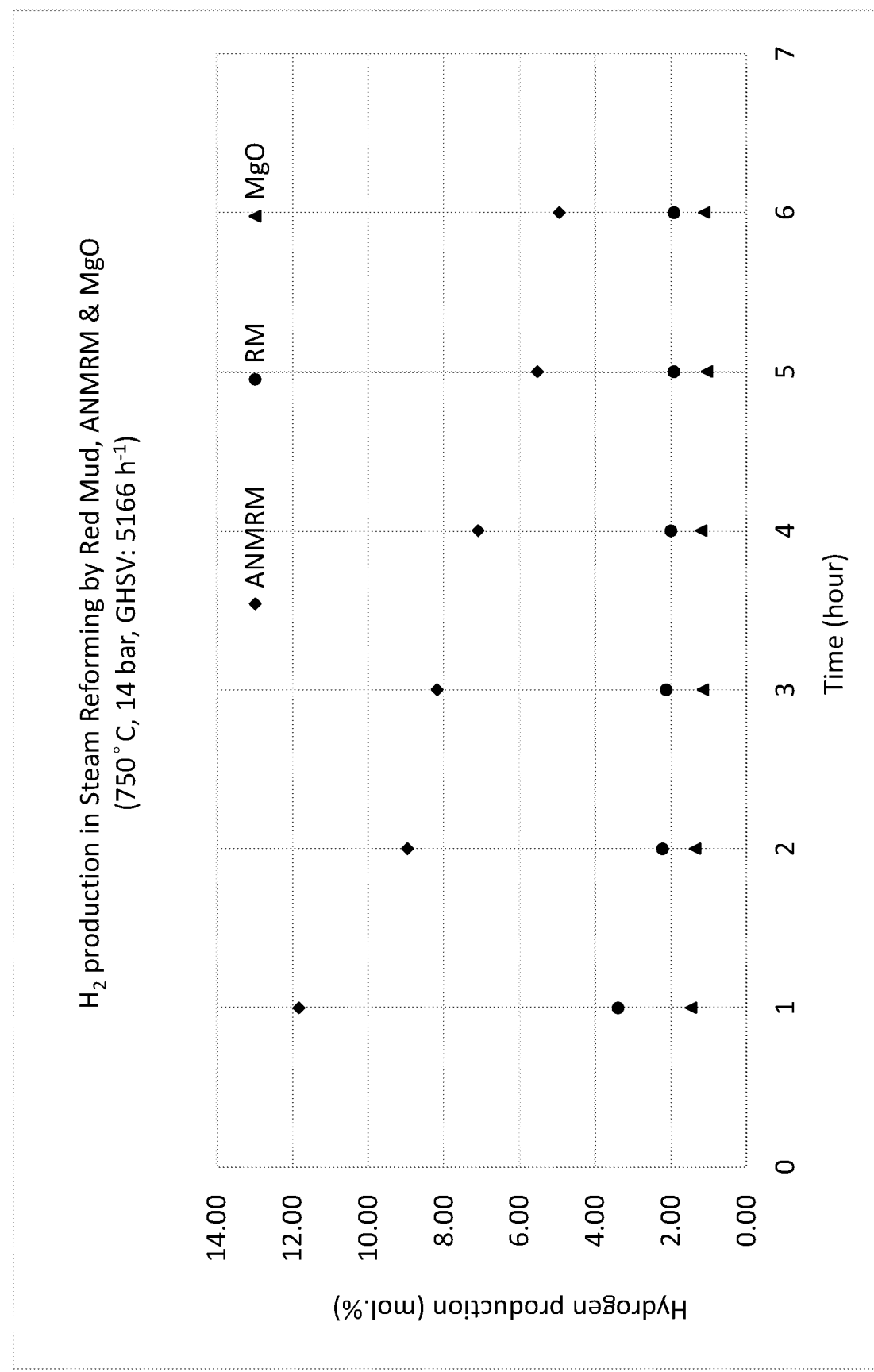
FIG. 1 is a graph showing mol. % of $H_2$ out of the total products produced from steam reforming of $CH_4$ in a steam reforming process for unmodified red mud (RM) used as a catalyst, for acid nickel-modified red mud (ANMRM) used as a catalyst, and for MgO used as a catalyst.

So that the manner in which the features and advantages of the embodiments of compositions of nickel-modified red mud along with systems and methods for steam reforming with such compositions and for producing such compositions, may be understood in more detail, a more particular description of the embodiments of the present disclosure briefly summarized previously may be had by reference to the embodiments thereof, which are illustrated in the appended drawing, which form a part of this specification. It is to be noted, however, that the drawing illustrates only various embodiments of the disclosure and are therefore not to be considered limiting of the present disclosure's scope, as it may include other effective embodiments as well.

As noted, red mud is a caustic waste material generated during alumina extraction from bauxite ore. Red mud includes a mixture of transition metals, for example as listed in Table 1.

TABLE 1

Example composition ranges for global red mud.

| Component | $Fe_2O_3$ | $Al_2O_3$ | $SiO_2$ | $Na_2O$ | CaO | $TiO_2$ |
|---|---|---|---|---|---|---|
| Approx. Weight Percentage | 30-60% | 10-20% | 3-50% | 2-10% | 2-8% | 10% |

Red mud was modified with nickel to be utilized and tested as a catalyst for steam reforming as follows. The unmodified red mud used as a catalyst precursor contained no detectable nickel. Saudi Arabian red mud from Ma'aden Aluminium Company, based at Ras Al Khair, Saudi Arabia was used to prepare a modified catalyst composition. Table 2 shows the weight percent for certain components in the unmodified Saudi Arabian red mud composition.

TABLE 2

Certain component weight percentages in unmodified Saudi Arabian red mud (RM) catalyst/catalyst support composition.

| Component | $Fe_2O_3$ | $Al_2O_3$ | $SiO_2$ | $Na_2O$ | CaO | $TiO_2$ |
|---|---|---|---|---|---|---|
| Weight Percentage | 18.75% | 25.22% | 18.88% | 11.77% | 7.97% | 6.89% |

The untreated red mud exhibited a Brunauer-Emmett-Teller (BET) surface area of about 16 $m^2/g$.

Table 3 shows an example composition for one embodiment of produced ANMRM for use as a modified catalyst.

TABLE 3

Example composition for a produced ANMRM used as a catalyst.

| Component | $Fe_2O_3$ | $Al_2O_3$ | $SiO_2$ | $Na_2O$ | CaO | $TiO_2$ | NiO |
|---|---|---|---|---|---|---|---|
| Weight Percentage | 32% | 12.4% | 8.5% | 0.08% | 3.8% | 15% | 24% |

Because red mud is a highly variable waste material, elemental composition will vary between samples and test results.

Catalyst Preparation. An acid nickel-modified red mud (ANMRM) catalyst with 18.6 wt. % nickel metal was prepared using a homogeneous precipitation process. Using an unmodified red mud catalyst precursor, 20 wt. % of nickel was targeted to be loaded in the red mud to enhance dry reforming activity, and 18.6 wt. % of nickel was confirmed by X-ray fluorescence (XRF) analysis (about 24% nickel oxide, also referred to as NiO). Depending on the catalyst application, nickel oxide can be loaded to a red mud precursor from between about 1 wt. % to about 50 wt. %. Nickel can be combined with red mud to result in nickel (II) oxide, NiO, in addition to or alternative to nickel (III) oxide, $Ni_2O_3$.

BET surface area analysis showed unmodified red mud surface area was about 16 $m^2/g$. BET surface area for acid modified red mud was about 170 $m^2/g$. BET surface area for acid modified red mud with nickel in addition to or alternative to molybdenum loading is, in some embodiments, between about 50 $m^2/g$ and about 90 $m^2/g$, for example about 63 $m^2/g$ or about 89 $m^2/g$.

First, 10 g of Saudi Arabian red mud from Ma'aden Aluminium Company, based at Ras Al Khair, Saudi Arabia was modified by dissolving dried, unmodified red mud in 100 mL of deionized water, and then the pH was neutralized using 40.5 mL of 37 wt. % hydrochloric acid. Afterward, 10 g of nickel (II) nitrate hexahydrate was dissolved in 50 mL of ethanol. The two solutions were mixed, and the final solution was precipitated by slowly adding between about 20 mL to about 30 mL aqueous ammonia with stirring until pH reached 8. Then, the mixed solution was filtered, dried in an oven at 105° C., and calcined at 600° C. for 4 hours. The final ANMRM product was ground to have a particle size of less than about 70 μm. The step of drying in an oven can last from about 2 to about 24 hours.

Other nickel-containing compounds can be used in addition to or alternative to nickel nitrate, including any nickel-containing compounds soluble in ethanol or other organic or inorganic alcohols, or in aqueous ammonia. Nickel can be combined with red mud to result in nickel (II) oxide, NiO, in addition to or alternative to nickel (III) oxide, $Ni_2O_3$.

Catalyst testing. Several tests on red mud catalytic activity and ANMRM catalytic activity for steam reforming were experimentally conducted. Red mud was tested as received without any modifications. It was placed in in a Micromeritics® PID Eng & Tech brand microactivity reactor designed for catalyst activity and selectivity analysis, and the same was done for the prepared ANMRM catalyst and for an MgO catalyst/catalyst support. The results are compared, for example, in FIG. 1. Results show that ANMRM catalytic activity for steam reforming is advantageously improved over non-modified red mud catalytic activity for steam reforming and improved over the MgO. MgO is a commercially-available catalyst/catalyst support material known for a variety of reforming processes with a surface area of about 29 $m^2/g$. The MgO was tested as received.

FIG. 1 is a graph showing mol. % of $H_2$ out of the total products produced from steam reforming of $CH_4$ in a steam reforming process for unmodified red mud used as a catalyst, for acid nickel-modified red mud (ANMRM) used as a catalyst, and for MgO used as a catalyst. Effects of nickel addition to red mud were studied. Experimental conditions in the steam reforming reactor included temperature at about 750° C., pressure at about 14 bar, and gas hourly space velocity (GHSV) at about 5166 $h^{-1}$. The test was conducted for 6 hours. Based in part on thermodynamics, suitable steam to methane molar ratios can be in a range of about 2:1 to about 4:1. In some embodiments, about 30 mol. % $CH_4$ is combined with 70 mol. % steam in a mixed feed. The GHSV was calculated for the mixed feed. GHSV generally measures the flow rate of the feed gases divided by the catalyst volume, which indicates the residence time of the reactants on the catalyst. For steam reforming, the feed composition will include $CH_4$ and steam. In some embodiments, the feed consists essentially of or consists of methane and steam.

Hydrogen production illustrated in FIG. 1 shows ANMRM catalyst outperformed its counterparts, the untreated red mud and MgO. Hydrogen production by ANMRM reached up to about 12 mol. %, and remained above 4 mol. % at 6 hours. On the other hand, unmodified red mud hydrogen production maxed out at below about 4 mol. %, then deteriorated. Slight methane conversion and hydrogen production activity of unmodified red mud could be attributed to the existence of several transition metals within red mud, and the greater conversion rate of ANMRM for methane and greater production rate of hydrogen can be attributed to the addition of nickel and synergies of the nickel with the existing transition metals in the red mud.

The singular forms "a," "an," and "the" include plural referents, unless the context clearly dictates otherwise. The term "about" when used with respect to a value or range refers to values including plus and minus 5% of the given value or range.

In the drawings and specification, there have been disclosed example embodiments of the present disclosure, and although specific terms are employed, the terms are used in a descriptive sense only and not for purposes of limitation. The embodiments of the present disclosure have been described in considerable detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

That claimed is:

1. A method for steam reforming over a modified red mud catalyst composition, the method comprising the steps of:
   providing a methane feed and a steam feed to react over the modified red mud catalyst composition at a temperature between about 500° C. to about 1000° C. and a pressure between about 5 bar and about 20 bar to produce synthesis gas comprising $H_2$ and CO, the modified red mud catalyst composition comprising:
   red mud material produced from an alumina extraction process from bauxite ore with a weight ratio of aluminum oxide to iron oxide of about 1:0.74 in the red mud material and a weight ratio of aluminum oxide to titanium oxide of about 1:0.27 in the red mud material; and
   nickel oxide, the nickel oxide present at between about 5 wt. % to about 40 wt. % of the modified red mud catalyst composition.

2. The method according to claim 1, where the temperature is between about 600° C. to about 800° C.

3. The method according to claim 1, where the temperature is about 750° C.

4. The method according to claim 1, where the pressure is between about 10 bar and about 15 bar.

5. The method according to claim 1, where the pressure is about 14 bar.

6. The method according to claim 1, where particles of the modified red mud catalyst composition have a particle size of less than about 70 μm.

7. The method according to claim 1, where the nickel oxide is present at between about 10 wt. % to about 30 wt. % of the modified red mud catalyst composition.

8. The method according to claim 1, where the nickel oxide is present at between about 15 wt. % to about 25 wt. % of the modified red mud catalyst composition.

9. The method according to claim 1, where the nickel oxide is present at about 20 wt. % of the modified red mud catalyst composition.

10. The method according to claim 1, further comprising carrying out a water-gas shift reaction on the synthesis gas produced in the synthesis gas producing step.

11. The method according to claim 10, where the step of carrying out the water-gas shift reaction applies the modified red mud catalyst composition as a catalyst.

12. The method according to claim 1, where a molar ratio of the steam feed to the methane feed is between about 2:1 and about 4:1.

13. The method according to claim 1, where produced $H_2$ is at least about 5 mol. % of produced products from the reaction for at least about 5 hours.

14. The method according to claim 1, where the Brunauer-Emmett-Teller (BET) surface area of the modified red mud catalyst composition is between about 50 $m^2/g$ and about 90 $m^2/g$.

15. The method according to claim 1, where the modified red mud catalyst composition further includes between about 2 wt. % and about 10 wt. % CaO and between about 5 wt. % and about 20 wt. % $SiO_2$.

* * * * *